United States Patent [19]
Hauge

[11] 3,744,321
[45] July 10, 1973

[54] ROTATING BODY UNBALANCE DETECTOR-LOCATOR

[76] Inventor: John D. Hauge, 6122 Carrollton Avenue, Indianapolis, Ind. 46220

[22] Filed: Dec. 16, 1971

[21] Appl. No.: 208,784

[52] U.S. Cl. .................... 73/457, 73/459, 340/52 R
[51] Int. Cl. ........................................... G01m 1/14
[58] Field of Search ............................ 73/457, 459; 340/52 R

[56] References Cited
UNITED STATES PATENTS

| | | | |
|---|---|---|---|
| 3,526,873 | 9/1970 | Burt | 73/457 UX |
| 2,955,232 | 10/1960 | Hosking et al. | 73/457 X |
| 3,078,720 | 2/1963 | Hofmann, Jr. | 73/457 |

*Primary Examiner*—James J. Gill
*Attorney*—R. S. Sciascia and P. S. Collignon

[57] ABSTRACT

A system of units of rotating body unbalance detectors and locators each unit having a pair of mechanical-to-electrical converter vibration sensors affixed to the suspension structure of each rotating body on two axes normal to each other and normal to the axis of rotation with the electrical outputs coupled to a comparator circuit for comparing with steady state voltage to produce outputs on indicator means for indicating static and/or dynamic unbalance in the channels of each unit rotating body in the system.

3 Claims, 4 Drawing Figures

ROTATING BODY UNBALANCE DETECTOR-LOCATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to identification of any angular velocity unbalance of rotating bodies and more particularly to a system of units indicating which of the rotating bodies of a plurality of rotating bodies are setting up vibration resulting from static unbalance and/or dynamic unbalance.

Problems arise in balancing pneumatic tired wheel structures of the type used on aircraft or automobiles where high rotative speeds are common, and particularly in determining which of the wheels supporting the vehicle in high speed travel are contributing vibrations. At the present time a typical approach is to overinflate the tires (a safety hazard in itself) and taxi or drive the vehicle at the normally useable speed. This will exaggerate the problem. Then, by letting the air out and returning the tires to normal pressures, one at a time, an idea may be formed as to which tire and/or wheel seemed to be contributing the most to the problem. At that time, the wheel and tire (or typically, wheels and tires, since it is difficult to establish a remembered reference) are checked for radial play with a runout gage, axial play with a runout gage, defective brake drum or disc, defective wheel, static balance, dynamic balance, etc. Due to the suspensions of vehicles possessing natural resonant frequencies, it is quite possible for small unbalances to create rather large disturbances if the oscillatory frequency is near the natural frequency of the suspension. Thus, the repairman finds himself looking for relatively small maladies in assemblies that may not be causing the problem at all. This is not an ideal repair environment and anyone who has experienced unbalanced wheels on his vehicle will testify to the high cost, long down time, and consistently poor results obtained with the present equipment used to find and correct unbalanced wheels. Such is also true of a system of rotating bodies other than aircraft or automobile wheels, whether with tires or not.

SUMMARY OF THE INVENTION

In the present invention a pair of vibration sensors of the directional type, such as acceleration sensors, are affixed to the suspension of a rotating body orthogonally to one another to yield information with respect to the plane of the exiting force to sense both static and dynamic mechanical vibrations. Low cost acceleration or vibration sensors may be used very effectively, such as phonograph cartridges, or more accurate accelerometers. Such devices are known to transduce mechanical vibrations into electrical signals. All such sensors are coupled to a comparator which compares each electrical signal to a reference signal or voltage to detect variations proportional to vibrations related to a particular rotating body in the nature of a static unbalance, a dynamic unbalance, or both. A rotating body that is dynamically balanced is also statically balanced, but the converse is not true, therefore both static and dynamic unbalance detections for each rotating body unit are desirable or necessary to provide corrective balance. The comparator provides outputs for each static and dynamic sensor to a meter or light indicator to identify the unbalanced body and the type of unbalance it is contributing. Meter indicators have the advantAge of indicating the amplitude of the unbalance; however, light indicators may be sufficient for low cost detector systems where the unbalanced rotating body is removed and balanced separately on equipment for that purpose. The indications can range from multiple meter readouts which identify the rotating body sustaining the highest relative level of acceleration. The power for the indicator system can be provided by the vehicle under test. The sensors can be designed to attach to the vehicle with clamps, belts, or by utilizing VELCRA material. It is accordingly a general object of this invention to provide indications of static and dynamic unbalance in each unit rotating body in a system of rotating body units to identify which rotating body is contributing vibration and the type of vibration.

BRIEF DESCRIPTION OF THE DRAWINGS

These and other objects and the advantages, features, and uses of the invention will become more apparent to those skilled in the art as a more detailed description proceeds when considered along with the accompanying drawings in which.

DESCRIPTION OF THE PREFERRED EMBODIMENT

Figure 1:
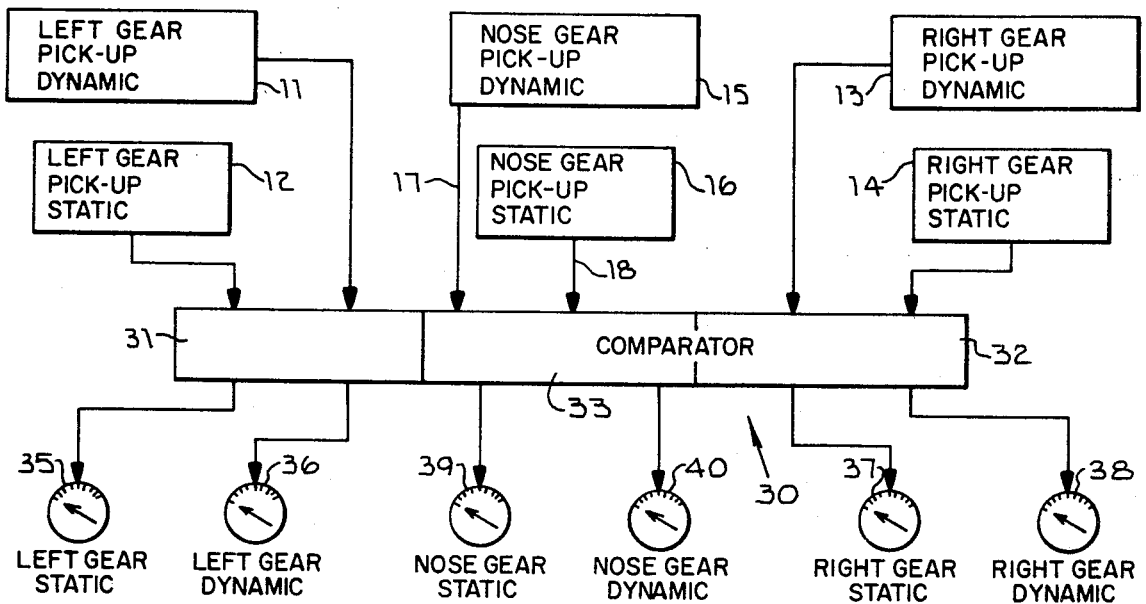
FIG. 1 is a block circuit schematic illustrating the flow of information.

Referring more particularly to FIG. 1 of the drawing where a block circuit schematic of the whole invention is illustrated, vibration sensor units such as directional crystal pickups or directional accelerometers are used and are illustrated as being applied, for the purpose of example, to the suspension wheel structure of an aircraft. In this Figure a left gear sensor 11 for dynamic vibration, a left gear sensor 12 for static vibration, a right gear sensor 13 for dynamic vibration, a right gear sensor 14 for static vibration, and nose gear sensors 15 and 16 for dynamic and static vibrations are all applied to the gear or wheel suspension of the aircraft.

Figures 2, 3:
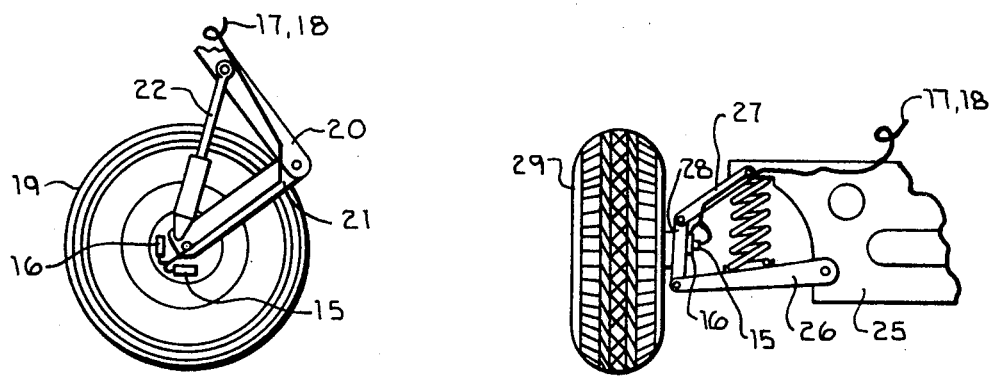
FIG. 2 is an illustration of an aircraft wheel suspension as the invention is used thereon.
FIG. 3 is an illustration of one front automobile wheel suspension with the invention applied thereto.

As more particularly illustrated in FIG. 2 a main gear or nose gear of an aircraft, herein illustrated, has a wheel 19 suspended by suspension arms 20 and 21 at an angle to receive an oleo strut 22 to absorb shocks between the wheel 19 and the aircraft structure (not shown). Using the suspended wheel in FIG. 2 as a nose wheel example, the nose gear pickup 15 is attached to the brake plate of the wheel in one direction to pick up dynamic vibration and the sensor 16 is likewise attached to the brake plate in the vertical direction of the wheel suspension to pick up static vibration. Although the sensors 15 and 16 are illustrated as being attached to the brake plate in an orthogonical manner, these sensors could be removably or temporarily attached to the suspension arm 21 or any other structural elements to respond to both vertical and lateral vibrations produced by wheel rotation. The sensors 15 and 16 provide electrical output over conductor means 17 and 18 to the points of use.

Referring again to FIG. 1 the outputs of the sensors 15 and 16 by way of conductors 17 and 18 are applied to a comparator circuit 31 in like manner with the outputs of the sensors 11, 12, 13, and 14. The comparator circuit 31 may be of any well known commercial type preferably of the integrated circuit module type which comprises a number of differential amplifier integrated circuits for comparing one each input from a sensor on one of the inputs of the differential amplifier in the comparator with the other input coupled to desirable biased voltage, as well understood by those skilled in the art of such comparators. The biased voltage is adjustable to set the amplitude level of each comparison to meet runway or road conditions; that is, for rough surface conditions the bias level can be adjusted upward so that unbalance will be indicated above road rough surface conditions. Also adjustment of the bias level may be used to compare the indicated signals with one another, as left gear signals with right gear signals, or nose gear signals with left gear signals, etc. In the comparator 31 shown in FIG. 1, three stages of paired comparators are illustrated although other comparators of a different number of stages may be required for particular purposes, such as in the case of checking the balance of the wheels on an automobile where four such stages would be required. Comparator 31 has as many outputs as it has inputs from sensors, these outputs being to indicator devices such as 35 through 40 which may be of the meter or amplitude indicating type to show the amplitude proportional to the amplitude of the vibrations sensed by the sensors 11 through 16. The indicators are arranged in channels for each unit to provide static and dynamic unbalanced conditions for the left gear as shown by indicators 35 and 36, for the right gear as shown by indicators 37 and 38, and for the nose gear as shown by the indicators 39 and 40. In this manner with the sensors attached to the various gear suspensions, as illustrated in FIGS. 1 and 2, and the vehicle taxied down a runway at takeoff or landing speed, any unbalance in the wheels or tires will be transmitted to the suspension system. Any unbalance either statically or dynamically or both will be indicated on the several indicators for each unit within each channel to identify the left gear, right gear, or nose gear producing the unbalance. The particular wheel or wheels including the tires can be particularly identified in this manner and the extent or amplitude of such unbalance can be determined from the indicators 35 through 40.

Referring more particularly to FIG. 3 the vibration sensors could be applied with equal facility to an automobile suspension, only one front wheel of which is shown in this Figure, which is suspended from an automobile frame 25 through the knee-action elements 26 and 27 to support the spindle 28 on which the wheel with a tire 29 is rotatably mounted. Here again the vibration sensor devcies 15 and 16 may be applied to the brake plate, as shown, or to the knee-action arms 26 and 27 or any other suspension structure subject to vibration responses of the rotating wheel and tire 29. As hereinabove stated four such units would be utilized with two channels of dynamic and static indications for each unit.

Figure 4:
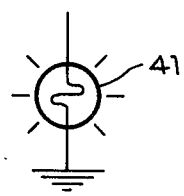
FIG. 4 shows a modification of the indicator means.

Referring more particulary to FIG. 4 there is illustrated a light source such as a neon type of light 41 which could be used to replace the indicators 35 through 40 to provide on-off indications of wheel unbalance. It is also to be understood that such neon light sources as 41 could be used in parallel with the amplitude indicating devices 35 through 40, where desirable.

OPERATION

In the operation of the invention static and dynamic vibration sensors of the directional crystal pickup type or directional accelerometer type, or any other known sensor of movement, may be applied to the suspension structure of rotating bodies and the outupts compared with fixed or biased voltages in a comparator to provide indications of those rotating bodies producing an unbalanced condition under rotation and whether such unbalance is static or dynamic. Such rotating bodies could be other than aircraft or automobile wheels since the inventon is equally applicable to any and all rotating bodies whether used singly as that of a gyroscope rotor or in plurality such as the wheels of an automobile, truck, train, bus, etc.

While many modifications may be made in the types of sensors, comparators or indicators used, it is to be understood that I desire to be limited in the spirit of my invention only by the scope of the appended claims.

I claim:

1. A system of simultaneously detecting static and dynamic unbalanced condition among a plurality of rotating bodies comprising:

suspension structure for each rotating body;

a pair of directional vibration sensors orthogonally and detachably affixed to said suspension structure of each rotating body unit to convert mechanical vibrations into proportional electrical signals on outputs thereof, one sensor of each unit pair being positioned to respond to static unbalance and the other sensor being positioned to respond to dynamic unbalance;

a comparator circuit having inputs coupled respectively to the outputs of each of said sensors for comparing the signal of each therefrom with reference signals and producing output signals on outputs thereof proportional to differences of said respective reference signals; and visual metered indicators coupled respectively to each comparator output channeling a static unbalance indicator and a dynamic unbalance indicator of each rotating body unit to provide visual metered indications of the amplitudes of static and dynamic unbalance for each rotating body.

2. A system of detecting and locating static and dynamic unbalance as set forth in claim 1 wherein said vibration sensors are crystal pickup transducers.

3. A system of detecting and locating static and dynamic unbalance as set forth in claim 1 wherein said vibration sensors are accelerometers.

* * * * *